United States Patent
Baumgartl et al.

(10) Patent No.: US 11,358,314 B2
(45) Date of Patent: Jun. 14, 2022

(54) APPARATUS FOR TRANSFERRING A COMPONENT PORTION OF AN INJECTION MOLDED PLASTIC COMPONENT FROM A FIRST STATE TO A SECOND STATE

(71) Applicant: EUWE EUGEN WEXLER HOLDING GMBH & CO. KG, Lauf a. d. Pegnitz (DE)

(72) Inventors: Sebastian Baumgartl, Neunkirchen (DE); Dennis Basusta, Hersbruck (DE)

(73) Assignee: EUWE EUGEN WEXLER HOLDING GMBH & CO. KG, Lauf a. d. Pegnitz (DE)

( * ) Notice: Subject to any disclaimer, the term of this patent is extended or adjusted under 35 U.S.C. 154(b) by 76 days.

(21) Appl. No.: 16/786,279

(22) Filed: Feb. 10, 2020

(65) Prior Publication Data
US 2020/0254667 A1    Aug. 13, 2020

(30) Foreign Application Priority Data

Feb. 11, 2019  (EP) .................................. 19156448

(51) Int. Cl.
*B29C 45/40*    (2006.01)
*B29C 45/44*    (2006.01)
*B29C 33/00*    (2006.01)

(52) U.S. Cl.
CPC ...... *B29C 45/4005* (2013.01); *B29C 33/0044* (2013.01); *B29C 45/44* (2013.01)

(58) Field of Classification Search
CPC ........ B29C 2045/4068; B29C 45/4435; B29C 2045/4492; B29C 2045/445; B29C 2045/4485; B29C 45/04; B29C 45/4005; B29C 53/02; B29C 33/0044; B29C 45/57; B29C 45/572; B29C 45/7626; B29C 2945/76896; B29C 2945/76903; B29C 45/44

See application file for complete search history.

(56) References Cited

U.S. PATENT DOCUMENTS 3,970,498 A  *  7/1976  Loew .................. B29C 67/0044
                                            156/211
4,281,816 A  *  8/1981  Carroll .................... B29C 45/56
                                            244/82

(Continued)

FOREIGN PATENT DOCUMENTS

| CN | 201 329 661 | 10/2009 |
| JP | 2001-334328 | 12/2001 |

OTHER PUBLICATIONS

European Search Report issued in European Patent Office (EPO) Patent Application No. 19156448.3, dated Jul. 19, 2019.

*Primary Examiner* — Niki Bakhtiari
*Assistant Examiner* — Emmanuel S Luk
(74) *Attorney, Agent, or Firm* — Greenblum & Bernstein, P.L.C.

(57) ABSTRACT

Apparatus for transferring at least one component portion of an at least partially undercut injection molded plastic component, particularly a window frame trim component, from a first state, in which the at least one component portion has a geometric deviation from a component-specific reference state, to a second state, in which the at least one component portion has no geometric deviation from the component-specific reference state.

15 Claims, 3 Drawing Sheets

(56) References Cited

U.S. PATENT DOCUMENTS

Figure 1:
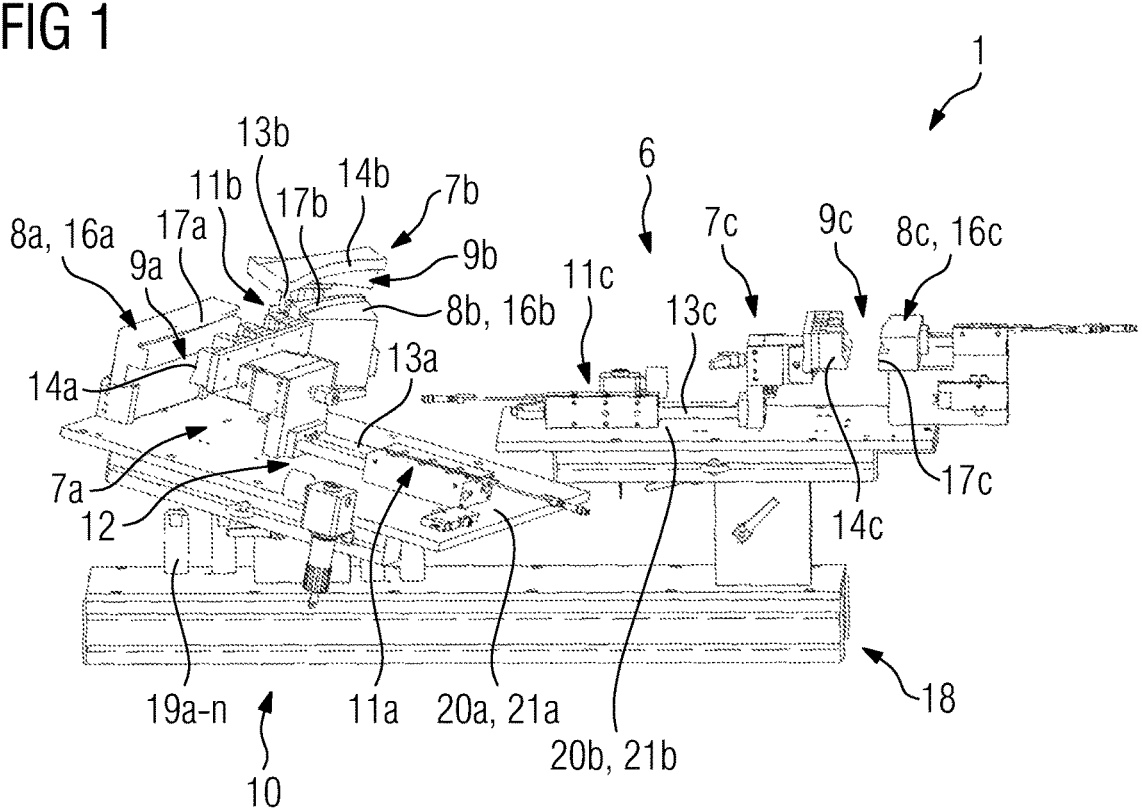

| | | | | |
|---|---|---|---|---|
| 4,531,704 A * | 7/1985 | Matthei | B29C 45/33 | 249/67 |
| 4,561,625 A * | 12/1985 | Weaver | B29C 70/763 | 249/85 |
| 4,839,122 A * | 6/1989 | Weaver | B29C 33/0044 | 264/129 |
| 4,896,415 A * | 1/1990 | Bock | B29C 49/00 | 220/760 |
| 5,108,687 A * | 4/1992 | Jourquin | B29C 70/763 | 264/279 |
| 5,225,215 A * | 7/1993 | Syvrud | B29C 37/0014 | 249/63 |
| 5,690,884 A * | 11/1997 | Cerny | B29C 45/2614 | 264/328.1 |
| 5,702,736 A * | 12/1997 | Henein | B29C 45/14065 | 425/556 |
| 6,123,535 A * | 9/2000 | Ash | B29C 33/28 | 425/125 |
| 6,461,137 B1 * | 10/2002 | Ash | B29C 33/0044 | 264/252 |
| 6,464,483 B1 * | 10/2002 | Lichtinger | B29C 31/00 | 264/277 |
| 6,474,970 B1 * | 11/2002 | Caldoro | B29C 33/0044 | 264/252 |
| 6,630,097 B1 * | 10/2003 | Maritan | F25D 23/02 | 264/553 |
| 8,721,953 B2 * | 5/2014 | Seo | F02M 35/10347 | 264/328.1 |
| 2008/0184760 A1 | 8/2008 | Carsley et al. | | |
| 2012/0082752 A1 * | 4/2012 | Li | B29C 45/4005 | 425/556 |
| 2013/0277886 A1 * | 10/2013 | Fujiwara | B29C 45/33 | 264/318 |
| 2016/0023383 A1 * | 1/2016 | Suiter | B29C 41/42 | 264/311 |
| 2018/0281251 A1 * | 10/2018 | Seo | B29C 45/44 | |
| 2020/0254660 A1 * | 8/2020 | Uchi | B29C 45/2681 | |

* cited by examiner

APPARATUS FOR TRANSFERRING A COMPONENT PORTION OF AN INJECTION MOLDED PLASTIC COMPONENT FROM A FIRST STATE TO A SECOND STATE

This application claims priority under 35 U. S. C. § 119(a) to Europe Application No. 19 156 448.3 filed Feb. 11, 2019, the disclosure of which is expressly incorporated by reference herein in its entirety.

The invention relates to an apparatus for transferring at least one component portion of an at least partially, particularly completely, undercut injection molded plastic component, particularly a window frame trim component, from a first state, in which the at least one component portion has a geometric deviation from a component-specific reference state, to a second state, in which the at least one component portion has no geometric deviation from the component-specific reference state.

Removing injection molded plastic components from an injection molding tool without deforming the injection molded plastic components in undesired manner is a known challenge in manufacturing plastic components by injection molding. This particularly, applies when an injection molded plastic component which is to be removed from an injection molding tool comprises component portions, such as undercut component portions, which impede removing the injection molded plastic component from the injection molded tool.

In practice, removing injection molded plastic components comprising component portions, such as undercut component portions, which impede removing the injection molded from an injection molding tool, oftentimes results in an undesired deformation of the injection molded plastic components. This undesired deformation may occasionally even result in that an injection molded plastic component does not satisfy required quality criteria, such as geometric tolerances, for instance.

In view of the fact that removing injection molded plastic components comprising respective component portions, such as undercut component portions, which impede removing the injection molded plastic components from an injection molding tool without an undesired deformation is difficult to achieve, there exists a need for a practical and reliable technical solution which allows to compensate for respective deformations such that the respective injection molded plastic component satisfies the required quality criteria.

It is the object of the present invention to provide an apparatus providing a practical and reliable technical solution which allows to compensate for respective deformations such that the respective injection molded plastic component satisfies the required quality criteria.

The object is achieved by an apparatus according to an embodiment of the present disclosure. The dependent claims refer to special embodiments of the apparatus. The object is also achieved by a method according to an embodiment of the present disclosure.

The apparatus described herein is an apparatus for transferring at least one component portion of an at least partially, particularly completely, undercut injection molded plastic component (hereinafter "plastic component"), particularly a window frame trim component, from a first state, in which the at least one component portion has a geometric deviation from a component-specific reference state, to a second state, in which the at least one component portion has no geometric deviation from the component-specific reference state. The apparatus is thus, configured to transfer at least one component portion of an at least partially, particularly completely, undercut plastic component, particularly a window frame trim component, from a first state, in which the at least one component portion has a geometric deviation from a component-specific reference state, to a second state, in which the at least one component portion has no geometric deviation from the component-specific reference state. A respective reference state can be a state in which the component portion and the plastic component, respectively fulfills component-specific geometric tolerances.

The plastic component is typically, an automotive plastic component, i.e. a plastic component which is to be mounted with an automotive vehicle or a vehicle body, respectively. Particularly, a respective automotive plastic component can be a trim component. Especially, a respective automotive plastic component can be a window frame trim component.

The plastic component is typically, a thin-walled plastic component; the wall-thickness of the plastic component typically, does not exceed 2 mm, particularly 1 mm.

The plastic component may have an at least partially, particularly completely, U-shaped cross-section. This particularly, applies when the plastic component is a window frame trim component.

The plastic component can be made of a PP or a PP-blend or PA or a PA-blend, for instance. In either case, the plastic material building the plastic component can comprise a certain amount of fibers, such as glass fibres, for instance. The amount of glass fibers can range between 10-30 vol.-%, for instance.

A geometric deviation of a respective component portion typically, results from removing the at least partially undercut plastic component from an injection molding tool.

A geometric deviation of a respective component portion can refer to any one- or multi-dimensional deviation of a spatial orientation and/or a spatial position of a respective component portion with respect to a component-specific reference state, i.e. a component-specific reference orientation and/or reference position. As a first example of a respective geometric deviation, a bending or bend of a component portion in a specific bending angle above or below a desired bending angle, which can also be 0°, can result in a respective deviation. As a second example of a respective geometric deviation, a torsion of a component portion in a specific torsion angle above or below a desired torsion angle, which can also be 0°, can result in a respective deviation. Other examples are conceivable.

In either case, the first state of a respective component portion may thus, be deemed or denoted as a deviation state (undesired), the second state of the respective component portion may thus, be deemed or denoted as a target state (desired).

The apparatus comprises an actuation device. The actuation device comprises at least one first actuation element. The at least one first actuation element is configured to exert a transfer force to an at least partially, particularly completely, undercut plastic component, particularly a window frame trim component, having at least one component portion having a first state, in which the at least one component portion has a geometric deviation from a component-specific reference state so as to transfer the at least one component portion from the first state to a second state, in which the at least one component portion has no geometric deviation from the reference state. The at least one first actuation element is particularly, configured to exert a respective transfer force to at least one respective component portion having a first state, in which the at least one component portion has a geometric deviation from a component-specific reference state, so as to transfer the at least one component portion from the first state to a second state in which the at least one component portion has no geometric deviation from the reference state.

The term "transfer force" may also embrace a torque suitable for transferring a respective component portion from a respective first state to a respective second state. Concrete examples of a respective transfer force may be push forces, pulling forces, bending forces, clamping forces, etc.

The term "transfer force" also embraces both static forces, i.e. particularly forces whose magnitude does not change over time of exertion, and dynamic forces, i.e. particularly forces whose magnitude changes over time of exertion. The at least one first actuation element is thus, generally configured to exert static or dynamic forces.

The properties of the transfer force exertable or exerted by the at least one first actuation element, i.e. particularly the direction of the transfer force, magnitude of the transfer force, duration of exertion of the transfer force, etc., typically, depend on the specific deviation of a respective component portion.

As an example, minor deviations of a respective component portion may require a comparatively low transfer force, whereas major deviations of a respective component portion may require a comparatively high transfer force. Also, other parameters of a respective component portion, e.g. chemical and/or physical parameters of a respective component portion, may be taken into account for choosing a suitable transfer force for transferring the component portion from the first state to the second state. As an example, the chemical structure, i.e. particularly the molecular structure, of specific plastic materials used for molding the component portion may require a comparatively low transfer force, whereas the chemical structure, i.e. particularly the molecular structure, of other plastic materials used for molding the component portion may require a comparatively high transfer force. As a further example, higher temperatures of a respective component portion, i.e. particularly temperatures in the region of the material-specific softening temperature of the plastic material used for molding the component portion, may require a comparatively low transfer force, whereas lower temperatures of a respective component portion, i.e. particularly temperatures (far) below the material-specific softening temperature of the plastic material used for molding the component portion, may require a comparatively high transfer force. Other examples are conceivable. The aforementioned principles also apply to all other properties, e.g. duration of exertion of the transfer force, of the transfer force in analogous manner.

The apparatus thus, provides a practical and reliable technical solution which allows to compensate for respective deformations such that a respective plastic component may satisfy the required quality criteria.

As is apparent from the above, the actuation device may comprise one or more respective actuation elements. As such, the actuation device may further comprise at least one further actuation element configured to exert a transfer force to an at least partially, particularly completely, undercut plastic component, particularly a window frame trim component, having at least one component portion having a first state, in which the at least one component portion has a geometric deviation from a component-specific reference state so as to transfer the at least one component portion from the first state to a second state, in which the at least one component portion has no geometric deviation from the reference state. All annotations regarding the at least one first actuation element also apply to the at least one further actuation element.

The at least one further actuation element may be arrangeable or arranged relative to the plastic component so that it may exert a transfer force on the same component portion of a respective plastic component as the at least one first actuation element or—in case that the plastic component comprises more than one respective component portion having a first state in which the at least one component portion has a geometric deviation from a component-specific reference state—the at least one further actuation element may be arrangeable or arranged relative to the plastic component so that it may exert a transfer force on a different component portion of the plastic component as the at least one first actuation element. In other words, (the) at least one first actuation element and (the) at least one further actuation element may be arrangeable or arranged relative to each other so as to act on the same component portion or on different component portions of a plastic component. Thus, according to an exemplary arrangement, the at least one further actuation element may be arrangeable or arranged (essentially) opposite to the at least one first actuation element. Thereby, a receiving gap for receiving a respective component portion between the at least one first actuation element and the at least one further actuation element may be built or defined between the at least one first actuation element and the at least one further actuation element. This (essentially) opposite arrangement of actuation elements may result in a highly effective exertion of transfer forces. Transfer forces can be exerted on the component portion from at least two sides.

The apparatus may further comprise at least one counter bearing element assignable or assigned to the at least one first actuation element and/or to the at least one further actuation element. The at least one counter bearing element may be arrangeable or arranged (essentially) opposite to the at least one first actuation element or the at least one further actuation element. A receiving gap for receiving a respective component portion between the at least one counter bearing element and the first actuation element or the at least one further actuation element may be built or defined between the at least one counter bearing element and the at least one first actuation element or the at least one further actuation element. Thus, according to a further exemplary arrangement, at least one counter bearing element may be arrangeable or arranged (essentially) opposite to the at least one first actuation element or the at least one further actuation element. Thereby, a receiving gap for receiving a respective component portion between the at least one counter bearing element and the first actuation element or the at least one further actuation element is built between the at least one counter bearing element and the at least one first actuation element or the at least one further actuation element. Also, a highly effective exertion of a transfer force is possible.

The at least one first actuation element and the at least one further actuation element, if any, typically, differ from a respective counter bearing element in that the at least one first actuation element and the at least one further actuation element, if any, can be (actively) moved relative to a respective component portion during operation of the apparatus, whereas a respective counter bearing element cannot be (actively) moved relative to a respective component portion during operation of the apparatus.

Hence, the at least one first actuation element and/or the at least one further actuation element may be moveably supported relative to a respective component portion during operation of the apparatus. Particularly, the at least one first actuation element and/or the at least one further actuation element may be moveably supported between at least one first orientation and/or position in which a respective transfer force is exertable or exerted on a respective component portion and a respective plastic component, respectively and a second orientation and/or position in which a respective transfer force is not exertable or exerted on a respective component portion and a respective plastic component, respectively.

The apparatus may comprise at least one drive device comprising at least one drive element assignable or assigned to the at least one first actuation element and/or the at least one further actuation element. The drive element, which may be built as or comprise a drive motor, particularly a linear drive motor, such as an electric motor, for instance may be configured to generate a drive force so as to move the at least one first actuation element and/or the at least one further actuation element between the at least one first orientation and/or position and the second orientation and/or position, or vice versa. The drive element may thus, be coupled with the at least one first actuation element and/or the at least one further actuation element so as to apply the drive force on the respective actuation element which results in a motion of the respective actuation element between the at least one first orientation and/or position and the second orientation and/or position, or vice versa.

Coupling between a respective drive element and a respective actuation element may be realized by a coupling structure comprising at least one coupling element. A respective coupling element is configured to couple a respective drive element with a respective actuation element. A respective coupling element can be built as or comprise a mechanical coupling element such as a plunger element, for instance.

Operation of a respective drive element is typically, controlled by a hardware—and/or software embodied control unit, e.g. a microprocessor, computer, etc., of the actuation device or apparatus, respectively. The control unit may be associated with a communication unit allowing for locally or globally communicating with other control units of a manufacturing environment for manufacturing plastic components.

The control unit may be configured so as to allow for an at least semi-automated operation of the apparatus.

In this regard, it has to be mentioned that the apparatus may comprise different at least one detection device being configured to detect an operational state, e.g. a force exertion state, a motion state, etc. of the actuation device and the at least one first actuation element and/or the at least one further actuation element. A respective detection device may thus, comprise at least one detection element, e.g. a sensing element, allowing for a detection of at least one operational state of the actuation device and the at least one first actuation element and/or the at least one further actuation element, respectively. Additionally or alternatively, a respective detection device may be configured to detect chemical and/or physical and/or geometric properties of the component portion or the plastic component, respectively. A respective detection device may thus, comprise at least one detection element, e.g. an optical detection element, such as a camera, a temperature detection element, such as a temperature sensor, etc., allowing for detection of at least one chemical and/or physical and/or geometric property of the component portion or the plastic component, respectively.

The at least one first actuation element and/or the at least one further actuation element may be provided with at least one transfer force transfer portion which is configured to (mechanically) contact a respective component portion so as to exert the transfer force to a respective component portion. A respective transfer force transfer portion is typically, the portion of the respective actuation element which (directly) contacts a respective component portion during operation of the apparatus. A respective transfer force transfer portion is thus, the portion of a respective actuation element with which the transfer force is exerted on the respective component portion during operation of the apparatus. Hence, a respective transfer force transfer portion is typically, provided at a free (distal) end of a respective actuation element.

The at least one force transfer portion may be at least partially, particularly completely, provided with a shape, particularly a contour, which corresponds to the shape, particularly the outer contour, of the component portion on which the transfer force is to be exerted during operation of the apparatus. In such a manner, a highly effective exertion of a respective transfer force is possible. Further, the actuation element may allow for a stable support of a respective component portion during exertion of the transfer force. As such, the at least one force transfer portion may have an individual design chosen under consideration of the shape of the component portion.

At least one force transfer portion may be moveably supported between at least two positions relative to a base body of the at least one first actuation element and/or the at least one further actuation element so as to be adaptable or adapted to a specific shape, particularly a specific outer contour, of the component portion on which the transfer force is to be exerted during operation of the apparatus. In such a manner, a highly effective exertion of a respective transfer force is possible. Further, the actuation element may allow for a stable support of a respective component portion during exertion of the transfer force.

The apparatus may further comprise a support device comprising at least one support element configured to support the or a respective plastic component during operation of the apparatus. A respective support element may be provided as a respective counter-bearing element, or vice versa. Hence, a respective plastic component is typically, supported by the supporting device during operation of the apparatus. A stable support typically, allows for a concerted exertion of respective transfer forces to respective component portions (also) contributing to a highly effective exertion of a respective transfer force.

The at least one support element may be provided with at least one support portion which is configured to contact a respective component portion so as to support the plastic component during operation of the apparatus. A respective support portion is typically, the portion of the respective support element which (directly) contacts a respective component portion during operation of the apparatus. A respective support portion is thus, the portion of a respective support element which support a respective component portion during operation of the apparatus. Hence, a respective support portion is typically, provided at a free (distal) end of a respective support element.

The at least one support portion may be at least partially, particularly completely, provided with a shape, particularly a contour, which corresponds to the shape, particularly the outer contour, of the component portion which is supported or which is to be supported during operation of the apparatus. In such a manner, a highly effective and stable support of a respective component portion is possible. As such, the at least one support portion may have an individual design chosen under consideration of the shape of the component portion.

At least one support portion may be moveably supported between at least two positions relative to a base body of the at least one support element so as to be adaptable or adapted to a specific shape, particularly a specific outer contour, of the component portion which is supported or which is to be supported during operation of the apparatus. In such a manner, a highly effective and stable support of a respective component portion is possible.

The apparatus may comprise a base structure, particularly built as or comprising a base plate. The base structure may comprise at least one connection interface configured to detachably connect the at least one first actuation element and/or the at least one further actuation element and/or the at least one support element with the base structure. Typically, the base structure comprises a plurality of respective connection interfaces distributed at pre-definable or pre-defined different positions across a surface of the base structure. A respective connection interface may be a mechanical connection interface, e.g. a connection interface allowing for a mechanical connection of a respective actuation element or a respective support element with the base structure. Merely as an example, a mechanical connection interface may allow for a bolted connection or a clamped connection. Other connection interfaces, e.g. magnetic connection interfaces, are conceivable as well.

The at least one first actuation element and/or the at least one further actuation element may be mounted on an actuation element mounting structure, e.g. a mounting plate. The actuation element mounting structure may comprise at least one connection interface face configured to co-act with the at least one connection interface of the base structure. Likewise, the at least one support element is mounted on a support element mounting structure, e.g. a mounting plate. The support element mounting structure may comprise at least one connection interface configured to co-act with the at least one connection interface of the base structure. Hence, by co-acting or interacting of respective connection interfaces, a respective actuation element and/or a respective support element may be deliberately connectable or connected at different orientations and/or positions on the base structure providing the apparatus with a high degree of flexibility and/or modularity. This is of advantage for using the apparatus for different designs of respective plastic components. The actuation element support structure and the support element mounting structure can be the same component.

The invention also refers a method for transferring at least one component portion of an at least partially, particularly completely, undercut plastic component, e.g. a window frame trim component, from a first state, in which the at least one component portion has a geometric deviation from a component-specific reference state, to a second state, in which the at least one component portion has no geometric deviation from the reference state.

The method is typically, performed with an apparatus as described herein. The method thus, comprises exerting with at least one first actuation element of an actuation device of an apparatus according to any of the preceding Claims, a transfer force to an at least partially, particularly completely, undercut plastic component having at least one component portion having a first state, in which the at least one component portion has a geometric deviation from a component-specific reference state so as to transfer the at least one component portion from the first state to a second state, in which the at least one component portion has no geometric deviation from the reference state.

The method can be implemented as a sub-method of a superordinate method of manufacturing an at least partially, particularly completely, undercut plastic component, particularly an automotive plastic component, especially a window frame trim component. The plastic component is also typically, a thin-walled plastic component; the wall-thickness of the plastic component typically, does not exceed 2 mm, particularly 1 mm.

The superordinate method comprises manufacturing an at least partially, particularly completely, undercut plastic component by injection molding, removing the injection molded plastic component from an injection molding tool, whereby the injection molded plastic component comprises at least one component portion which is in a first state, in which the at least one component portion has a geometric deviation from a component-specific reference state, arranging the injection molded plastic component in an apparatus as described herein, and exerting with at least one first actuation element of an actuation device of the respective apparatus, a transfer force to the injection molded plastic component so as to transfer the at least one component portion from the first state to a second state, in which the at least one component portion has no geometric deviation from the reference state.

The exerting step is typically, performed directly after, e.g. within a time window of at most 30 seconds, particularly at most 20 seconds, preferably at most 10 seconds, removing of the injection molded plastic component from the injection molding tool. This is of advantage since the plastic material used for manufacturing the injection molded plastic component still has the capability of being effectively deformed.

All annotations regarding the apparatus also apply to the method(s).

Figure 2:
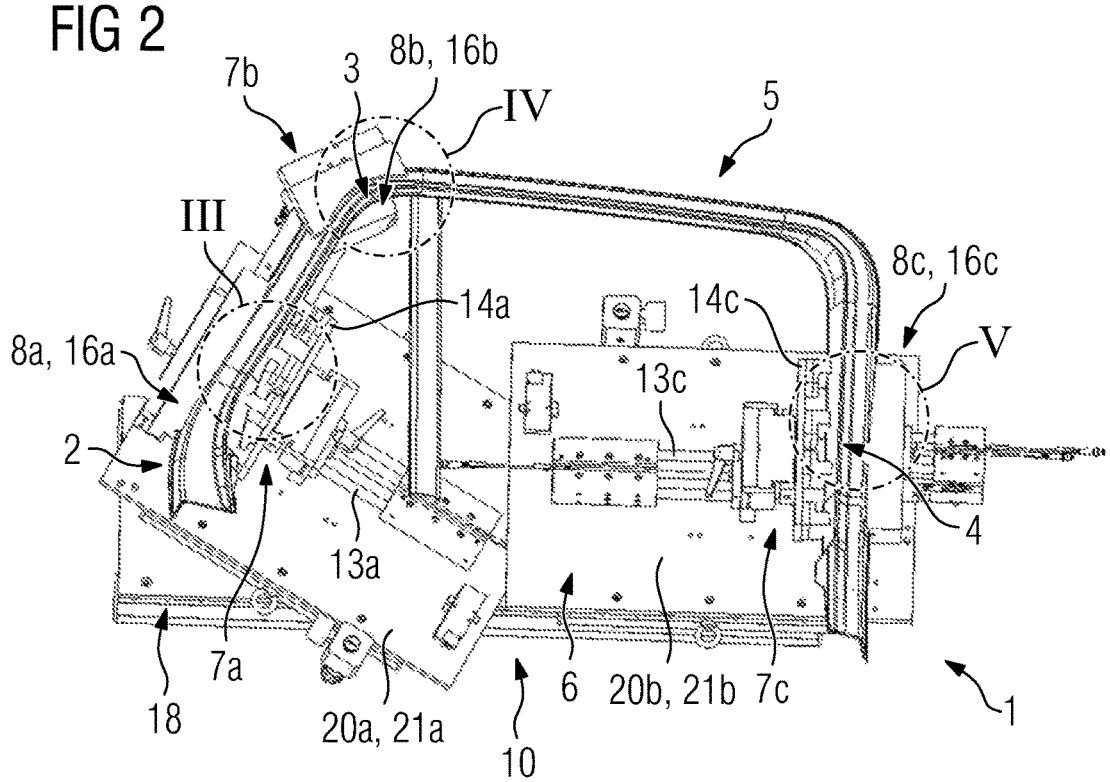
Figure 3:
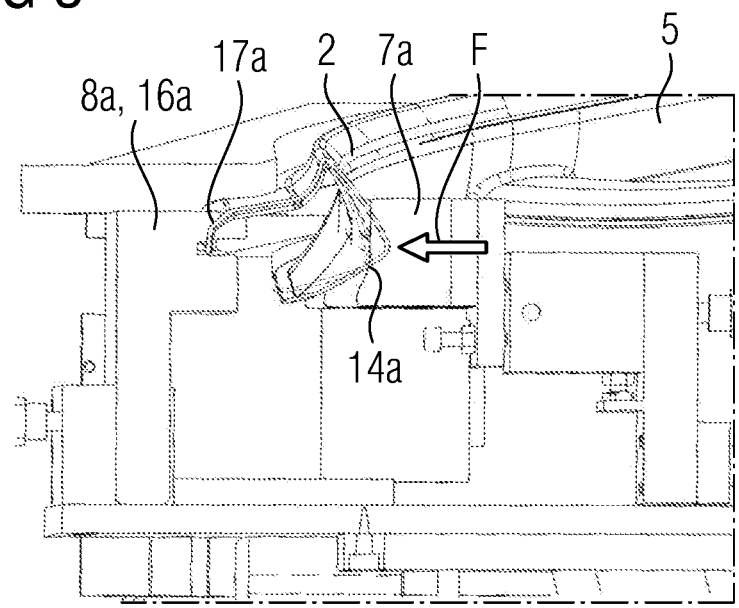
Figure 4:
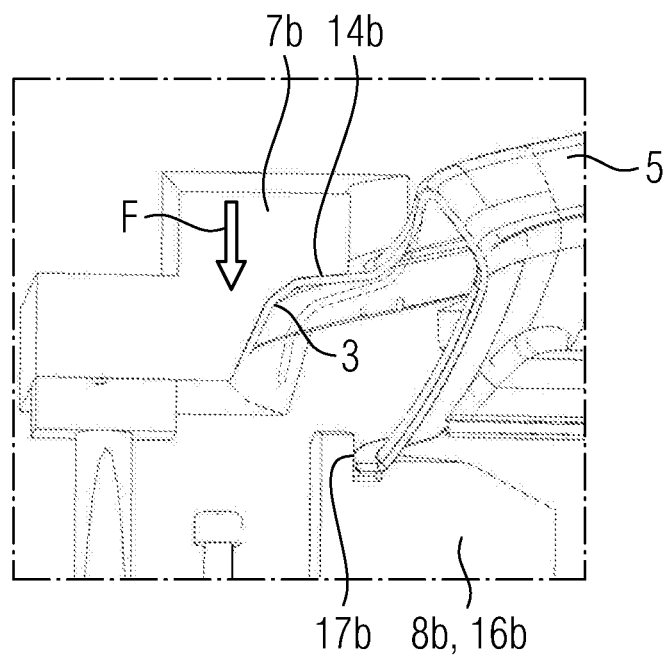
Figure 5:
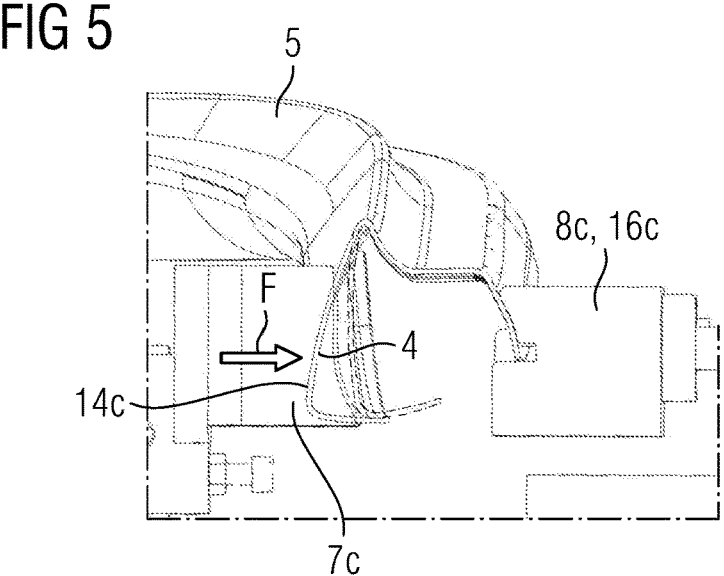
Figure 6:
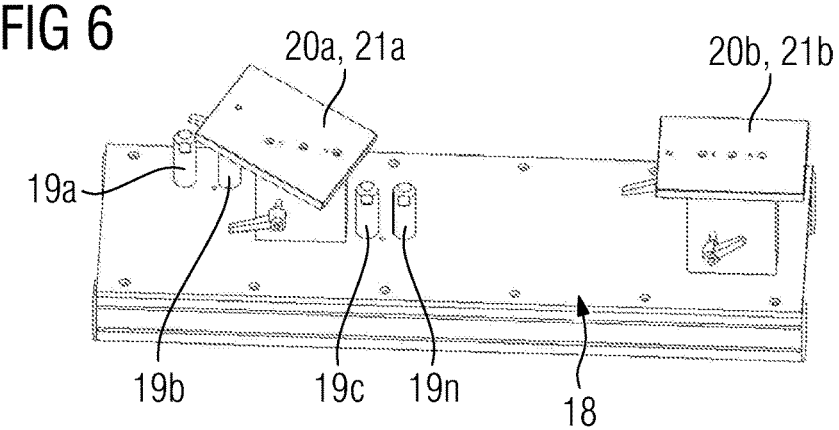
Figure 7:
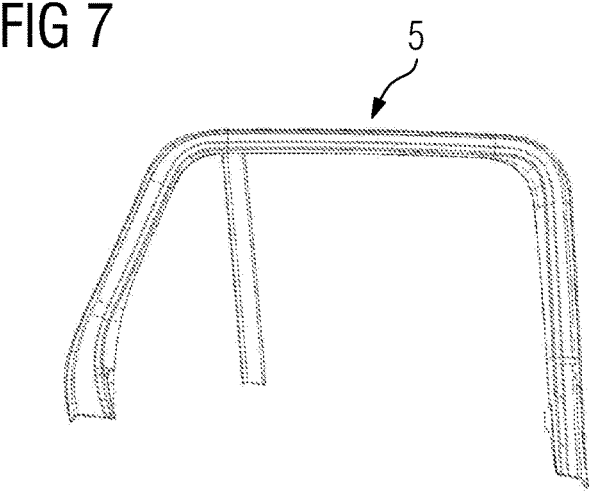

Exemplary embodiments of the invention are described with reference to the FIG., whereby:

FIG. 1, 2 each shows a principle drawing of an apparatus according to an exemplary embodiment;

FIG. 3-5 each show an enlarged view of the details III-V of FIG. 2;

FIG. 6 shows a principle drawing of a support structure according to an exemplary embodiment; and FIG. 7 shows a principle drawing of an undercut plastic component according to an exemplary embodiment.

FIG. 1, 2 each shows a principle drawing of an apparatus 1 according to an exemplary embodiment of the present invention. The apparatus 1 is an apparatus for transferring one or more component portions 2-4 (FIG. 2-5) of an undercut injection molded plastic component 5 from a first state (indicated with continuous line in FIG. 3-5), in which a respective component portion 2-4 has a geometric deviation from a component-specific reference state, to a second state (indicated with a dotted line in FIG. 3-5), in which a respective component portion 2-4 has no geometric deviation from the component-specific reference state. The apparatus 1 is thus, configured to transfer a respective component portion 2-4 of an undercut plastic component 5 from a first state, in which a respective component portion 2-4 has a geometric deviation from a component-specific reference state, to a second state, in which a respective component portion 2-4 has no geometric deviation from the component-specific reference state.

In either case, the first state of a respective component portion 2-4 may thus, be deemed or denoted as a deviation state (undesired), the second state of a respective component portion 2-4 may thus, be deemed or denoted as a target state (desired).

The geometric deviation of a respective component portion 2-4 typically, results from removing plastic component 5 from an injection molding tool.

An exemplary embodiment of a respective plastic component 5 is shown in FIG. 7 in a frontal view. As is apparent from FIG. 7, the plastic component 5 is a thin-walled automotive component, i.e. a window frame trim component. The wall thickness of the plastic component 5 is typically, does not exceed 2 mm, particularly 1 mm. In the exemplary embodiment of the FIG., the plastic component 5 has a U-shaped cross-section (see FIG. 3-5). Yet, plastic components 5 having other cross-sections are conceivable.

The plastic component 5 can be made of a PP or a PP-blend or PA or a PA-blend, for instance. In either case, the plastic material building the plastic component 5 can comprise a certain amount of fibers, such as glass fibers, for instance. The amount of glass fibers can range between 10-30 vol.-%, for instance.

The apparatus 1 comprises an actuation device 6. As is apparent from FIG. 1, 2, the actuation device 6 comprises a number of actuation elements 7a-7c. Particularly, the actuation device 6 comprises three actuation elements 7a-7c, i.e. a first actuation element 7a, a second actuation element 7b, and a third actuation element 7c in the exemplary embodiments of the FIG. One of the actuation elements 7a-7c may be deemed or denoted as a first actuation element, other actuation elements may be deemed or denoted as further actuation elements.

Each actuation element 7a-7c is configured to exert a transfer force F (see arrows in FIG. 3-5) to a respective plastic component 5 having a respective component portion 2-4 having a first state, in which the respective component portion 2-4 has a geometric deviation from a component-specific reference state so as to transfer the respective component portion 2-4 from the first state to a second state, in which the respective component portion 2-4 has no geometric deviation from the reference state. Each respective actuation element 7a-7c is particularly, configured to exert a respective transfer force F to a respective component portion 2-4 having a first state, in which the respective component portion 2-4 has a geometric deviation from a component-specific reference state, so as to transfer the respective component portion 2-4 from the first state to a second state in which the respective component portion 2-4 has no geometric deviation from the reference state.

In the exemplary embodiments of the FIG., each actuation element 7a-7c is assignable or assigned to a specific component portion 2-4 of the plastic component 5. As is apparent from FIG. 2, actuation element 7a is assignable or assigned to component portion 2, actuation element 7b is assignable or assigned to component portion 3, and actuation element 7c is assignable or assigned to component portion 4.

As is apparent from FIG. 1-5, the apparatus 1 may further comprise counter bearing elements 8a-8c assignable or assigned to respective actuation elements 7a-7c. The counter bearing elements 8a-8c are arrangeable or arranged (essentially) opposite to respective actuation elements 7a-7c. A receiving gap 9a-9c for receiving a respective component portion 2-4 between respective counter bearing elements 8a-8c and a respective actuation elements 7a-7c may be built or defined between respective counter bearing elements 8a-8c and assigned actuation elements 7a-7c (see FIG. 1).

The actuation elements 7a-7c typically differ from respective counter bearing elements 8a-8c in that the actuation elements 7a-7c can be (actively) moved relative to a respective component portion 2-4 during operation of the apparatus 1 (as indicated in FIG. 3-5), whereas respective counter bearing elements 8a-8c cannot be (actively) moved relative to a respective component portion 2-4 during operation of the apparatus 1.

As such, the actuation elements 7a-7c are moveably supported relative to a respective component portion 2-4 during operation of the apparatus 1. Particularly, the actuation elements 7a-7c are moveably supported between at least one first position (see FIG. 3-5) in which a respective transfer force F is exertable or exerted on a respective component portion 2-4 and a second position in which a respective transfer force F is not exertable or exerted on respective component portions 2-4.

As is further apparent from FIG. 1, 2, the actuation elements 7a-7c may be provided with transfer force transfer portions 14a-14c which are configured to (mechanically) contact a respective component portion 2-4 so as to exert the transfer force F to the respective component portions 2-4. A respective transfer force transfer portion 14a-14c is typically, the portion of a respective actuation element 7a-7c which (directly) contacts a respective component portion 2-4 during operation of the apparatus 1. A respective transfer force transfer portion 14a-14c is thus, the portion of a respective actuation element 7a-7c with which the transfer force F is exerted on the respective component portion 2-4 during operation of the apparatus 1. Hence, a respective transfer force transfer portion 14a-14c is typically, provided at a free (distal) end of a respective actuation element 7a-7c.

As is also apparent from the FIG., a respective force transfer portion 14a-14c may be provided with a shape, particularly a contour, which corresponds to the shape, particularly the outer contour, of the component portion 2-4 on which the transfer force F is to be exerted during operation of the apparatus 1. As such, a respective force transfer portion 14a-14c may have an individual design chosen under consideration of the shape of a respective component portion 2-4.

Respective force transfer portions 14a-14c may be moveably supported between at least two positions relative to a base body of a respective actuation element 7a-7c so as to be adaptable or adapted to a specific shape, particularly a specific outer contour, of the component portion 2-4 on which the transfer force F is to be exerted during operation of the apparatus 1.

As is apparent from the FIG., the apparatus 1 may further comprise a support device 15 comprising support elements 16a-16c configured to support the or a respective plastic component 5 during operation of the apparatus 1. The support elements 16a-16c may be provided as the aforementioned counter-bearing elements 8a-8c, or vice versa.

As is further apparent from the FIG., a respective support element 16a-16c may be provided with at least one support portion 17a-17c which is configured to contact a respective component portion 2-4 so as to support the plastic component 5 during operation of the apparatus 1. A respective support portion 17a-17c is typically, the portion of a respective support element 16a-16c which (directly) contacts a respective component portion 2-4 during operation of the apparatus 1. A respective support portion 17a-17c is thus, the portion of a respective support element 16a-16c which support a respective component portion 2-4 during operation of the apparatus 1. Hence, a respective support portion 17a-17c is typically, provided at a free (distal) end of a respective support element 16a-16c.

Respective support portions 17a-17c may be provided with a shape, particularly a contour, which corresponds to the shape, particularly the outer contour, of the component portion 2-4 which is supported or which is to be supported during operation of the apparatus 1. As such, a respective support portion 17a-17c may have an individual design chosen under consideration of the shape of a respective component portion 2-4.

Respective support portions 17a-17c may be moveably supported between at least two positions relative to a base body of a respective support element 16a-16c so as to be adaptable or adapted to a specific shape, particularly a specific outer contour, of the component portion 2-4 which is supported or which is to be supported during operation of the apparatus 1.

As is apparent from FIG. 1, 2, the apparatus 1 may comprise a drive device 10 comprising drive elements 11a-11c assignable or assigned to the respective actuation elements 7a-7c. The drive elements 11a-11c, which may be built as or comprise a drive motor, particularly a linear drive motor, such as an electric motor, for instance may be configured to generate a drive force so as to move the respective assigned actuation element 7a-7c the at least one first position and the second position, or vice versa. The drive elements 11a-11c are thus, coupled with respective assigned actuation elements 7a-7c so as to apply the drive force on the respective assigned actuation element 7a-7c which results in a motion of the respective actuation element 7a-7c between the at least one first and second position, or vice versa.

Coupling between respective drive elements 11a-11c and respective assigned actuation elements 7a-7c may be realized by respective coupling structures 12 comprising at least one coupling element 13a-13c. Respective coupling elements 13a-13c are configured to couple respective drive elements 11a-11c with respective actuation elements 7a-7c. As is apparent from FIG. 1, 2, respective coupling elements 13a-13c can be built as or comprise a mechanical coupling element such as a plunger element, for instance.

As is further apparent from FIGS. 1, 2, and 6, the apparatus 1 may comprise a base structure 18, particularly built as or comprising a base plate. The base structure 18 comprises connection interfaces 19a-19n configured to detachably connect respective actuation elements 7a-7c and/or support elements 16a-16c with the base structure 18. As is apparent from FIG. 6, the base structure 18 comprises a plurality of respective connection interfaces 19a distributed at pre-definable or pre-defined different positions across a surface of the base structure 18. A respective connection interface 19a-19n may be a mechanical connection interface, e.g. a connection interface allowing for a mechanical connection of a respective actuation element 7a-7c or a respective support element 16a-16c with the base structure 18. The connection interfaces 19a-19n are exemplarily shown as connection stubs in the FIG. Merely as an example, a mechanical connection interface may allow for a bolted connection or a clamped connection. Other connection interfaces, e.g. magnetic connection interfaces, are conceivable as well.

FIGS. 1, 2, and 6 further show that the actuation elements 7a-7c may be mounted on an actuation element mounting structure 20a, b, e.g. a mounting plate. The actuation element mounting structure 20a, b may comprise a connection interface face configured to co-act with at least one connection interface 19an of the base structure 18. Likewise, the support elements 16a-16c may be mounted on a support element mounting structure 21a, b, e.g. a mounting plate. The support element mounting structure 21a, 21b may comprise a connection interface configured to co-act with at least one connection interface 19a-19n of the base structure 18. Hence, by co-acting or interacting of respective connection interfaces, respective actuation elements 7a-7c and/or respective support elements 16a-16c may be deliberately connectable or connected at different orientations and/or positions on the base structure 18 providing the apparatus 1 with a high degree of flexibility and/or modularity. As is particularly, apparent from FIG. 6, the actuation element support structure 20a, b and the support element mounting structure 21a, b can be the same component.

Operation of respective drive elements 11a-11c is typically, controlled by a hardware- and/or software embodied control unit (not shown), e.g. a microprocessor, computer, etc., of the actuation device 6 or apparatus 1, respectively. The control unit may be particularly, configured to operate respective drive elements 11a-11c dependent or independent from each other, i.e. particularly synchronously or asynchronously.

The control unit may be particularly, configured to operate respective drive elements 11a-11c dependent or independent from each other, i.e. particularly synchronously or asynchronously.

The control unit may be associated with a communication unit (not shown) allowing for locally or globally communicating with other control units of a manufacturing environment for manufacturing plastic components 5.

The control unit may be configured so as to allow for an at least semi-automated operation of the apparatus 1.

Even though not depicted in the FIG., actuation elements 7a-7c may be arrangeable or arranged in an (essentially) opposite arrangement so that oppositely arranged actuation elements 7a-7c may exert a transfer force F on the same component portion 2-4 of a respective plastic component 5. Thus, according to another exemplary arrangement, two actuation elements 7a-7c may be arrangeable or arranged in an opposite arrangement. Thereby, a respective receiving gap 9a-9c for receiving a respective component portion 2-4 between the respective actuation elements 7a-7c may be built or defined between the respective actuation elements 7a-7c.

Even though not depicted in the FIG., the apparatus 1 may comprise at least one detection device being configured to detect an operational state, e.g. a force exertion state, a motion state, etc. of the actuation device 6 and at least one actuation element 7a-7c, respectively. A respective detection device may thus, comprise at least one detection element, e.g. a sensing element, allowing for a detection of at least one operational state of the actuation device 6 and at least one actuation element 7a-7c, respectively. Additionally or alternatively, a respective detection device may be configured to detect chemical and/or physical and/or geometric properties of a respective component portion 2-4 or the plastic component 5, respectively. A respective detection device may thus, comprise at least one detection element, e.g. an optical detection element, such as a camera, a temperature detection element, such as a temperature sensor, etc., allowing for detection of at least one chemical and/or physical and/or geometric property of a respective component portion 2-4 or the plastic component 5, respectively.

The apparatus 1 allows for implementing a method for transferring at least one component portion 2-4 of an at least partially, particularly completely, undercut plastic component 5, e.g. a window frame trim component, from a first state, in which the at least one component portion 2-4 has a geometric deviation from a component-specific reference state, to a second state, in which the at least one component portion 2-4 has no geometric deviation from the reference state.

The method comprises exerting with at least one actuation element 7a-7c of an actuation device 6, a transfer force F to a plastic component 5 having at least one component portion 2-4 having a first state, in which the at least one component portion 2-4 has a geometric deviation from a component-specific reference state so as to transfer the component portion 2-4 from the first state to a second state, in which the component portion 2-4 has no geometric deviation from the reference state.

The method can be implemented as a sub-method of a superordinate method of manufacturing an at least partially, particularly completely, undercut plastic component 5, particularly a window frame trim component.

The superordinate method comprises manufacturing a respective plastic component 5 by injection molding, removing the injection molded plastic component 5 from an injection molding tool, whereby the plastic component 5 comprises at least one component portion 2-4 which is in a first state, in which the at least one component portion 2-4 has a geometric deviation from a component-specific reference state, arranging the plastic component 5 in an apparatus 1, and exerting with at least one actuation element 7a-7c of an actuation device 6 of the apparatus 1, a transfer force F to the plastic component 5 so as to transfer the component portion 2-4 from the first state to a second state, in which the component portion 2-4 has no geometric deviation from the reference state.

The exerting step is typically, performed directly after, e.g. within a time window of at most 30 seconds, particularly at most 20 seconds, preferably at most 10 seconds, removing of the plastic component 5 from the injection molding tool.

The invention claimed is:

1. Apparatus for transferring at least one component portion of an at least partially undercut injection molded plastic component, particularly a window frame trim component, from a first state, in which the at least one component portion has a geometric deviation from a component-specific reference state, to a second state, in which the at least one component portion has no geometric deviation from the component-specific reference state, the apparatus comprising:
   an actuation device comprising at least one first actuation element configured to exert a transfer force to the at least partially undercut injection molded plastic component, particularly the window frame trim component, having at least one component portion having the first state, in which the at least one component portion has the geometric deviation from the component-specific reference state so as to transfer the at least one component portion from the first state to the second state, in which the at least one component portion has no geometric deviation from the reference state, and
   a control unit which is configured to control operation of the actuation device or the at least one first actuation element, respectively, so that the transfer force to be exerted on the least partially undercut injection molded plastic component is applied only after removing of the component from an injection molding tool.

2. Apparatus according to claim 1, wherein the actuation device further comprises at least one further actuation element configured to exert a transfer force to the at least partially undercut injection molded plastic component having the at least one component portion having the first state, in which the at least one component portion has the geometric deviation from the component-specific reference state so as to transfer the at least one component portion from the first state to the second state, in which the at least one component portion has no geometric deviation from the reference state.

3. Apparatus according to claim 2, wherein the at least one further actuation element is arrangeable or arranged opposite to the at least one first actuation element, whereby a receiving gap for receiving a respective component portion between the at least one first actuation element and the at least one further actuation element is defined between the at least one first actuation element and the at least one further actuation element.

4. Apparatus according to claim 2, further comprising at least one counter bearing element assignable or assigned to the at least one first actuation element and/or to the at least one further actuation element, wherein the at least one counter bearing element is arrangeable or arranged opposite to the at least one first actuation element or the at least one further actuation element, whereby a receiving gap for receiving a respective component portion between the at least one counter bearing element and the first actuation element or the at least one further actuation element is built between the at least one counter bearing element and the at least one first actuation element or the at least one further actuation element.

5. Apparatus according to claim 2, wherein the at least one first actuation element and/or the at least one further actuation element is moveably supported between at least one first orientation and/or position in which a respective transfer force is exertable on a respective plastic component and a second orientation and/or position in which a respective transfer force is not exertable on a respective plastic component.

6. Apparatus according to claim 2, wherein the at least one first actuation element and/or the at least one further actuation element is provided with at least one transfer force transfer portion which is configured to contact a respective component portion so as to exert the transfer force to the plastic component.

7. Apparatus according to claim 6, wherein the at least one force transfer portion is at least partially provided with a shape, particularly a contour, which corresponds to the shape, particularly the outer contour, of the component portion on which the transfer force is to be exerted during operation of the apparatus.

8. Apparatus according to claim 6, wherein the at least one force transfer portion is moveably supported between at least two positions relative to a base body of the at least one first actuation element and/or the at least one further actuation element so as to be adaptable to a specific shape, particularly a specific outer contour, of the component portion on which the transfer force is to be exerted during operation of the apparatus.

9. Apparatus according to claim 1, further comprising a support device comprising at least one support element configured to support the or a respective plastic component during operation of the apparatus.

10. Apparatus according to claim 9, wherein the at least one support element is provided with at least one support portion which is configured to contact a respective component portion so as to support the plastic component during operation of the apparatus.

11. Apparatus according to claim 10, wherein the at least one support portion is at least partially provided with a shape, particularly a contour, which corresponds to the shape, particularly the outer contour, of the component portion of the plastic component during operation of the apparatus.

12. Apparatus according to claim 10, wherein the at least one support portion is moveably supported between at least two positions relative to a base body of the at least one support element so as to be adaptable to a specific shape, particularly a specific outer contour, of the component portion on which the transfer force is to be exerted during operation of the apparatus.

13. Apparatus according to claim 1, comprising a base structure, particularly built as or comprising a base plate, the base structure comprising at least one connection interface configured to detachably connect the at least one first actuation element and/or the at least one further actuation element and/or the at least one support element with the base structure.

14. Apparatus according to claim 13, wherein the at least one first actuation element and/or the at least one further actuation element is mounted on an actuation element mounting structure, the actuation element mounting structure comprising at least one connection interface face configured to co-act with the at least one connection interface of the base structure, and/or the at least one support element is mounted on a support element mounting structure, the support element mounting structure comprising at least one connection interface configured to co-act with the at least one connection interface of the base structure.

15. Method for transferring at least one component portion of an at least partially undercut injection molded plastic component from a first state, in which the at least one component portion has a geometric deviation from a component-specific reference state, to a second state, in which the at least one component portion has no geometric deviation from the reference state, comprising:

exerting with the at least one first actuation element of the actuation device of the apparatus according to claim 1, a transfer force to the at least partially undercut injection molded plastic component having the at least one component portion having the first state, in which the at least one component portion has the geometric deviation from the component-specific reference state so as to transfer the at least one component portion from the first state to the second state, in which the at least one component portion has no geometric deviation from the reference state.

* * * * *